United States Patent
Kruglick

(10) Patent No.: US 9,940,458 B2
(45) Date of Patent: Apr. 10, 2018

(54) FLAG BASED THREAT DETECTION

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/454,326

(22) Filed: Aug. 7, 2014

(65) Prior Publication Data

US 2016/0042181 A1 Feb. 11, 2016

(51) Int. Cl.
*G06F 12/14* (2006.01)
*G06F 21/55* (2013.01)
*G06F 21/56* (2013.01)

(52) U.S. Cl.
CPC ............ *G06F 21/564* (2013.01); *G06F 12/14* (2013.01); *G06F 21/554* (2013.01); *G06F 2212/1052* (2013.01)

(58) Field of Classification Search
CPC .... G06F 12/14; G06F 12/1416; G06F 12/145; G06F 21/554; G06F 21/566
See application file for complete search history.

(56) References Cited

U.S. PATENT DOCUMENTS

| | | | |
|---|---|---|---|
| 5,182,805 A * | 1/1993 | Campbell | G06F 9/52 711/163 |
| 8,327,059 B2 | 12/2012 | Chen et al. | |
| 8,479,198 B2 | 7/2013 | Hayakawa et al. | |
| 8,813,240 B1 * | 8/2014 | Northup | G06F 21/554 726/22 |
| 8,930,647 B1 | 1/2015 | Smith | |
| 9,166,988 B1 * | 10/2015 | Shin | H04L 63/14 |
| 2006/0161719 A1 | 7/2006 | Bennett et al. | |
| 2006/0259734 A1 | 11/2006 | Sheu et al. | |
| 2007/0067435 A1 | 3/2007 | Landis et al. | |
| 2008/0005447 A1 | 1/2008 | Schoenberg et al. | |
| 2008/0244573 A1 * | 10/2008 | Sahita | G06F 9/45558 718/1 |

(Continued)

OTHER PUBLICATIONS

"A First Look at the Target Intrusion, Malware," Accessed at http://web.archive.org/web/20140730040956/https://krebsonsecurity.com/2014/01/a-first-look-at-the-target-intrusion-malware/, Accessed on Aug. 1, 2014, pp. 20.

(Continued)

*Primary Examiner* — Hal Schnee
(74) *Attorney, Agent, or Firm* — Moritt Hock & Hamroff LLP; Steven S. Rubin, Esq.

(57) ABSTRACT

Technologies are generally described for systems, devices and methods effective to generate an alert in a computing system. In some examples, a read request may be identified to read from a memory location in a memory. The memory location may include first data accessible by a virtual machine and an instance manager module. The first data may be allowed to be read from the memory location. A write request may be identified to write second data to the memory location. A flag may be identified in response to the identification of the write request. The flag may be associated with the memory location. An alert may be generated, based on the identification of the flag and the identification of the write request.

16 Claims, 6 Drawing Sheets

(56) References Cited

U.S. PATENT DOCUMENTS

| | | | |
|---|---|---|---|
| 2010/0223432 A1* | 9/2010 | Eidus | G06F 12/109 |
| | | | 711/148 |
| 2010/0250895 A1 | 9/2010 | Adams et al. | |
| 2011/0047543 A1 | 2/2011 | Mohinder | |
| 2011/0202919 A1* | 8/2011 | Hayakawa | G06F 9/45558 |
| | | | 718/1 |
| 2012/0102285 A1* | 4/2012 | Savagaonkar | G06F 12/145 |
| | | | 711/163 |
| 2012/0265959 A1* | 10/2012 | Le | G06F 17/30067 |
| | | | 711/162 |
| 2013/0132690 A1 | 5/2013 | Epstein | |
| 2013/0174148 A1* | 7/2013 | Amit | G06F 9/45558 |
| | | | 718/1 |
| 2013/0283004 A1 | 10/2013 | Devine et al. | |
| 2014/0108701 A1 | 4/2014 | Liljeberg | |
| 2015/0052614 A1* | 2/2015 | Crowell | G06F 21/566 |
| | | | 726/25 |
| 2015/0178497 A1* | 6/2015 | Lukacs | G06F 9/461 |
| | | | 726/23 |

OTHER PUBLICATIONS

"Attacks happen," Accessed at http://web.archive.org/web/20140401041542/http://www.triumfant.com/default.asp, Accessed on Aug. 1, 2014, p. 1.

"Cve-2014-0038 / timeoutpwn.c," Accessed at https://github.com/saelo/cve-2014-0038/blob/master/timeoutpwn.c, Accessed on Aug. 1, 2014, pp. 4.

"Data deduplication," Accessed at http://web.archive.org/web/20140529082535/http://en.wikipedia.org/wiki/Data_deduplication, Accessed on Aug. 1, 2014, pp. 7.

"Falcon Platform," Accessed at http://web.archive.org/web/20140702193353/http://www.crowdstrike.com/technology/index.html, Accessed on Aug. 1, 2014, pp. 2.

"JIT spraying," Accessed at http://web.archive.org/web/20131229055345/https://en.wikipedia.org/wiki/JIT_spraying, Accessed on Aug. 1, 2014, pp. 3.

"Linux 2 6 32," released on Aug. 1, 2014, Accessed http://web.archive.org/web/20140701083200/http://kernelnewbies.org/Linux_2_6_32, Accessed on Aug. 1, 2014, pp. 14.

"Linux Programmers Manual," Accessed at http://web.archive.org/web/20140703095326/http://man7.org/linux/man-pages/man2/mmap.2.html, Accessed on Aug. 1, 2014, pp. 9.

"Linux/mm/ksm.c," Accessed at http://web.archive.org/web/20130726082000/http://lxr.free-electrons.com/source/mm/ ksm.c, Accessed on Aug. 1, 2014, pp. 38.

"Local root exploit for CVE-2014-0038," Accessed at https://github.com/saelo/cve-2014-0038, Accessed on Aug. 1, 2014, pp. 2.

"Malware morphs to greater numbers," Accessed at http://web.archive.org/web/20081204195149/http://www.securityfocus.com/brief/763, Accessed on Aug. 1, 2014, pp. 2.

"Memory Protection Constants," Accessed at http://web.archive.org/web/20140625225339/http://msdn.microsoft.com/en-us/library/windows/desktop/aa366786(v=vs.85).aspx, Accessed on Aug. 1, 2014, pp. 3.

"Signature-Less Malware Detection Detect, Analyze. Respond," Accessed at http://web.archive.org/web/20140721164149/http://www.emc.com/security/rsa-ecat.htm, Accessed on Aug. 1, 2014, pp. 2.

"Triumfant Launches Memory Process Scanner Module to Detect and Stop In-Memory Attacks," Nov. 4, 2013, pp. 3.

Alperovitch, D., "Actionable Indicators for Detection of Signs of Compromise from Target-related Breaches," Jan. 16, 2014, pp. 6.

Chouchane, R. et al., "Detecting Machinemorphed Malware Variants via Engine Attribution," Journal of Computer Virology and Hacking Techniques, 2013, pp. 137-157, vol. 9, No. 3.

Constantin, L., "Java-based Web attack installs hard-to-detect malware in RAM," Accessed at http://web.archive.org/web/20131023213305/http://www.infoworld.com/d/security/java-based-web-attack-installs-hard-detect-malware-in-ram-188960, Accessed on Aug. 1, 2014, pp. 3.

Jones, M. T., "Anatomy of Linux Kernel Shared Memory: Memory de-duplication in the Linux kernel," Apr. 7, 2010, pp. 1-9.

King, S. et al., "Debugging operating systems with time-traveling virtual machines," USENIX 2005 Annual Technical Conference, General Track, 2005, pp. 1-15.

Paul, "Ephemeral In-Memory Malware Common At High Value Targets," Accessed at http://web.archive.org/web/20131104214636/https://securityledger.com/2013/11/ephemeral-in-memory-malware-common-at-high-value-targets/ , Accessed on Aug. 1, 2014, pp. 5.

Wang, X. et al., "Selective Hardware/software Memory Virtualization," In ACM SIGPLAN Notices, 2011, pp. 217-226, vol. 46.

Wood, T., et al., "Memory Buddies: Exploiting Page Sharing for Smart Colocation in Virtualized Data Centers," In Proceedings of the 2009 ACM SIGPLAN/SIGOPS International Conference on Virtual Execution Environments, 2009, pp. 31-40.

"Data Deduplication," accessed at http://www.emc.com/corporate/glossary/data-deduplication.htm, accessed on Jan. 28, 2016, pp. 2.

"Performance Evaluation of Intel EPT Hardware Assist," VMware ESX builds 140815 & 13632 (internal builds), pp. 1-14, (Mar. 30, 2009).

"What exactly do shadow page tables (for VMMs) do?," accessed at http://stackoverflow.com/questions/9832140/what-exactly-do-shadow-page-tables-for-vmms-do, accessed on Jan. 28, 2016, pp. 2.

Griffiths, N., "Active Memory Deduplication," accessed at https://www.youtube.com/watch?v=r2CGKOWHUss&list=PL6EC2185E401DFE7A&index=4, accessed on Jan. 25, 2016, pp. 2.

International Search Report and Written Opinion in International Patent Application No. PCT/US2013/069238, dated May 2, 2014, 8 pages.

Jason, "Rapid Virtualization Indexing (RVI)," accessed at http://www.boche.net/blog/index.php/2009/03/08/rapid-virtualization-indexing-rvi/, posted on Mar. 8, 2009, pp. 2.

Riley, R. et al., "Guest-Transparent Prevention of Kernel Rootkits with VMM-Based Memory Shadowing," Lecture Notes in Computer Science vol. 5230, pp. 1-20 (2008).

Ristenpart, T. et al., "Hey, You, Get Off of My Cloud: Exploring Information Leakage in Third-party Compute Clouds," In Proceedings of the 16th ACM Conference on Computer and Communications Security, pp. 199-212 (2009).

Suzaki, K. et al., "Effects of Memory Randomization, Sanitization and Page Cache on Memory Deduplication," Eurosec'12, pp. 1-6 (2012).

Suzaki, K. et al., "Memory Deduplication as a Threat to the Guest OS," In Proceedings of the Fourth European Workshop on System Security, vol. 1, pp. 1-6 (2011).

Suzaki, K. et al., "Software Side Channel Attack on Memory Deduplication," accessed at https://web.archive.org/web/20130210035556/http://staff.aist.go.jp/c.artho/papers/SOSP11-Poster-Web.pdf, accessed on Jan. 29, 2016, pp. 2.

Waldspurger, C.A. et al., "Memory Resource Management in VMware ESX Server," Proceeding of the 5th Symposium on Operating Systems Principles (OSDI), pp. 181-194 (Dec. 9-11, 2002).

\* cited by examiner

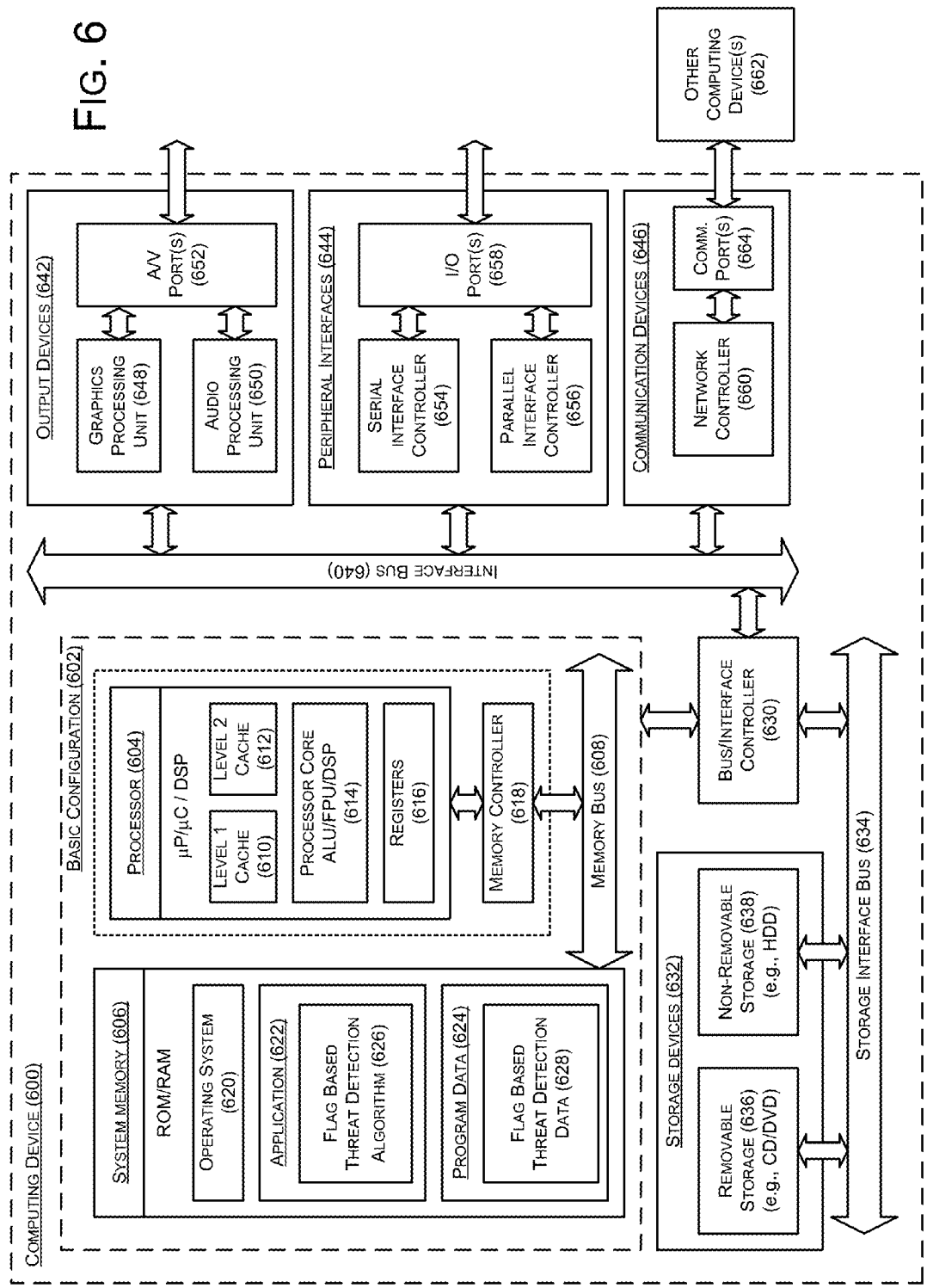

FLAG BASED THREAT DETECTION

BACKGROUND

Unless otherwise indicated herein, the materials described in this section are not prior art to the claims in this application and are not admitted to be prior art by inclusion in this section.

A hash may be created of malware to identify the malware based on a signature of the malware. Some malware may be polymorphic in nature. Memory may be monitored to detect the impact of malware on an operating environment, based on modifications made to the memory. Technologies may compute and compare memory hashes in order to detect potential threats.

SUMMARY

In some examples, methods to generate an alert in a computing system are generally described. In some examples, the methods may include identifying a read request to read from a memory location in a memory. In some further examples, the memory location may include first data accessible by a virtual machine and an instance manager module. In other examples, the methods may further include allowing the first data to be read from the memory location. In various other examples, the methods may further include identifying a write request to write second data to the memory location. In other examples, the methods may further include identifying a flag in response to the identification of the write request. In various examples, the flag may be associated with the memory location. In some examples, the methods may further include generating the alert, based on the identification of the flag and the identification of the write request.

In some examples, methods to generate an alert in a computing system are generally described. In some examples, the methods may include identifying a first write request to write first data to a first memory location of a memory. In various examples, the first memory location may be accessible by a first virtual machine and a second virtual machine. In some other examples, the methods may further include identifying a first flag in response to the identification of the first write request. The first flag may be associated with the first memory location. In various other examples, the methods may further include determining, in response to the identification of the first flag, that the first memory location does not include guarded memory. In other examples, the methods may further include, in response to the determination that the first memory location does not include guarded memory and in response to the identification of the first flag, copying second data stored at the first memory location to a second memory location. In some further examples, the methods may include identifying a second write request to write third data to a third memory location. The third memory location may be accessible by the first virtual machine and the second virtual machine. In some other examples, the methods may further include identifying a second flag in response to the identification of the second write request. The second flag may be associated with the third memory location. In some other examples, the methods may further include determining, in response to the identification of the second flag, that the third memory location includes guarded memory. In various other examples, the methods may further include generating the alert, in response to the determination that the third memory includes the guarded memory.

In some examples, computing devices are generally described. In various examples, the computing devices may include a first memory that includes instructions. In some other examples, the computing devices may further include a processor configured to be in communication with the first memory. In some examples, the processor may be effective to execute the instructions to identify a write request to write first data to a memory location of a second memory. In various examples, the memory location may include second data accessible by a virtual machine and an instance manager module. In some other examples, the processor may be effective to execute the instructions to identify a flag in response to the identification of the write request. The flag may be associated with the memory location. In some further examples, the processor may be effective to execute the instructions to determine, in response to the identification of the flag, that the memory location is a guarded memory location. In some examples, the processor may be effective to execute the instructions to generate an alert, in response to the determination that the memory location is the guarded memory location.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 is a block diagram illustrating an example computing device that is arranged to implement flag based threat detection;

Figure 1:
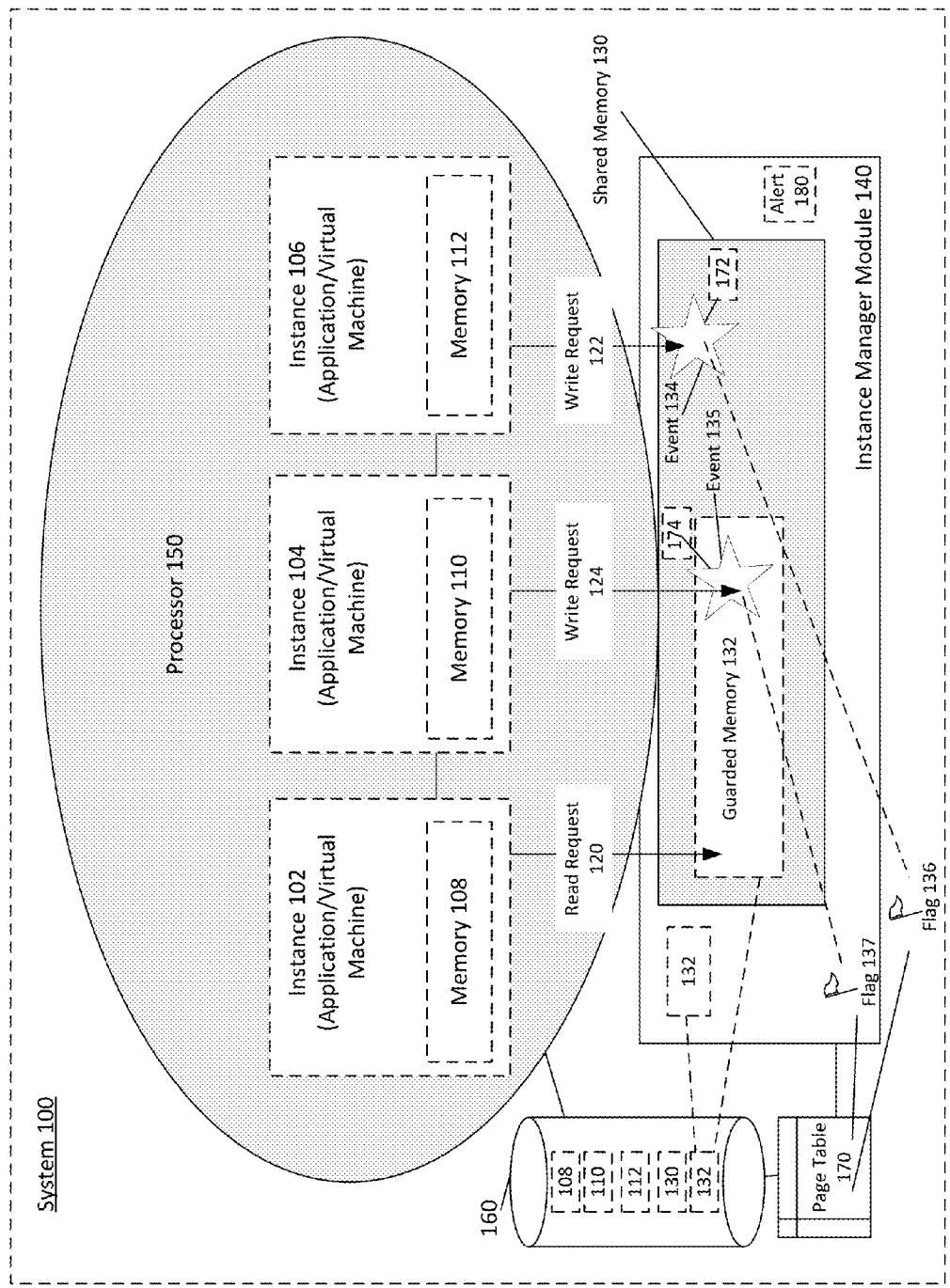
FIG. 1 illustrates an example system that can be utilized to implement flag based threat detection.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to flag based threat detection.

Briefly stated, technologies are generally described for systems, devices and methods effective to generate an alert in a computing system. In some examples, a read request may be identified to read from a memory location in a memory. For example, a processor may receive a request from a virtual machine to read from a memory location in a memory. The memory location may include first data accessible by a virtual machine and the instance manager module. In some examples, the data in the memory location may be shared among multiple virtual machines. The first data may be allowed to be read from the memory location. A write request may be identified to write second data to the memory location. For example, the virtual machine may attempt to write data to the memory location. A flag may be identified in response to the identification of the write request. In an example, the flag may be a copy on write flag. The instance manager module may receive notification of the flag via the processor. The flag may be associated with the memory location. In some examples, the copy on write flag may be stored in association with the memory location in a page table or other data structure. An alert may be generated, based on the identification of the flag and the identification of the write request. In some examples, the alert may be generated by a compromise detection module.

FIG. 1 illustrates an example system 100 that can be utilized to implement flag based threat detection, arranged in accordance with at least some embodiments described herein. System 100 may include a processor 150 and a system memory 160. In some examples, processor 150 may be a multicore processor, and may include one or more cores. Processor 150 may be operable to execute one or more instances (such as, for example, instances 102, 104, and/or 106). In some examples, instances 102, 104, and/or 106 may represent applications and/or virtual machines. Memories 108, 110, and/or 112 in system memory 160 may be designated to instances 102, 104, and/or 106, as indicated by dotted lines. In some further examples, memories 108, 110, and/or 112 may be blocks, pages, or other areas in system memory 160 allocated to instances 102, 104, and/or 106. A page table 170 may be a data structure configured to associate one or more instances with one or more blocks, pages, or other areas of system memory 160. Page table 170 may be stored in system memory 160 or in another memory associated with system 100.

Processor 150 may be configured to be in communication with an instance manager module 140. In some examples, instance manager module 140 may be a hypervisor, virtual machine manager, or an application manager. A shared memory 130 may be allocated to instance manager module 140. Shared memory 130 may be, for example, locations of system memory 160 which may be accessible and/or shared by multiple virtual machine instances and/or applications (such as instances 102, 104, and/or 106). In some examples, instance manager module 140 may set or control access by instances (such as instances 102, 104, and/or 106) to shared memory 130. In some examples, data stored in pages or in other portions of shared memory 130 may be deduplicated or shared. In an example, portions of shared memory 130 may include data which may be shared among instances 102, 104, 106, and/or other virtual machines or applications.

In some examples, instance manager module 140 may be configured to identify portions of system memory 160 as guarded memory 132. Although guarded memory 132 is depicted in FIG. 1 within shared memory 130, guarded memory 132 may be located anywhere within system memory 160. As will be discussed in further detail below, guarded memory 132 may include pages (or other units of data) of shared memory 130 and/or system memory 160 which may have been designated as write-protected memory. Guarded memory 132 may be tracked using a table or other data structure. In some examples, processor 150 may be effective to access memory locations in system memory 160 and guarded memory 132.

In some examples, memory locations in guarded memory 132 and/or shared memory 130 may be associated with flags 136, 137 in page table 170. Flags 136, 137 may be, for example, copy on write flags or other indicators which may signal processor 150 to take one or more actions, as will be discussed in further detail below. A memory location associated with a particular flag 136, 137 in page table 170 may be termed a "flagged location." An attempt by an instance to perform a memory write to a flagged location in guarded memory 132 and/or shared memory 130 may cause processor 150 to experience an event, such as events 134, 135. Such an event may signal processor 150 to perform a context switch to instance manager module 140. Instance manager module 140 may then consult one or more registers of processor 150 to determine that a memory write is directed to a flagged location. Instance manager module 140 may detect events 134, 135 based on information from processor 150. As will be discussed in further detail below, instance manager module 140 may be configured to take one or more actions in response to detection of events 134, 135. In an example using a LINUX operating system, copy on write flags may mark pages "READ+EXECUTE", as opposed to "WRITE", such that when a write request is received a "Page Fault" event is generated.

In an example to be described in more detail below, instances, which may include virtual machines, may attempt to read from and/or write to various memory locations in system memory 160. If the instances and/or virtual machines attempt to write to a location which is associated with a particular flag in page table 170, processor 150 may experience an event. In response to the event, processor 150 may perform a context switch to instance manager module 140. Instance manager module 140 may be configured to make a determination as to whether or not the memory location includes guarded memory. As will be discussed in further detail below, instance manager module 140 may be configured to perform one or more operations based on whether the memory location includes or does not include guarded memory.

For example, processor 150 may identify a read request 120, generated by instance 102. Read request 120 may be a request to read from a memory location in guarded memory 132. Processor 150 may allow data stored in guarded memory 132 to be read in response to read request 120. In another example, processor 150 may identify a write request 122, generated by instance 106. Write request 122 may be a request to write data to a memory location 172 in shared memory 130. In an example, memory location 172 may be a page in shared memory 130 which is permissible to be written to by instances (such as instances 102, 104, and/or 106). Processor 150 may identify flag 136 associated with memory location 172, to which write request 122 is directed.

In some examples, processor 150 may be configured to identify flag 136 in response to the identification of write request 122. Processor 150 may experience event 134 as a result of the memory write being directed to memory location 172, associated with flag 136. In response to event 134, processor 150 may perform a context switch from instance 106 to instance manager module 140. Instance manager module 140 may detect or register event 134 in response to write request 122 being directed to memory location 172, which is associated with flag 136. In some examples, flag 136 may be a copy on write flag.

As will be discussed in further detail below, instance manager module 140 may determine, in response to identification of flag 136 and/or event 134, that memory location 172 does not include memory addresses or memory cells designated as guarded memory. In response to the determination that memory location 172 does not include guarded memory, and in response to the identification of the copy on write flag 136, instance manager module 140 may copy data stored at memory location 172 to memory 112, designated to instance 106. Instance manager module 140 may pass control of processor 150 back to instance 106. In some examples, instance 106 may then alter, modify, and/or overwrite data copied from memory location 172 to memory 112.

In another example, processor 150 may identify a write request 124, generated by instance 104. Write request 124 may be a request to write data to a memory location 174 in guarded memory 132. In an example, memory location 174 may be a page or block in system memory 160 and/or shared memory 130 which is impermissible to be written to by instances (such as instances 102, 104, and/or 106). Processor 150 may identify flag 137 associated with memory location 174, to which write request 124 is directed. In some examples, processor 150 may be configured to identify flag 137 in response to the identification of write request 124. Processor 150 may experience event 135 as a result of the memory write being directed to memory location 174, associated with flag 137. In response to event 135, processor 150 may perform a context switch to instance manager module 140. Instance manager 140 may detect or register event 135 in response to write request 124 being directed to memory location 174, which is associated with flag 137. In some examples, flag 137 may be a copy on write flag.

As will be discussed in further detail below, instance manager module 140 may determine, in response to identification of flag 137 and/or event 135, that memory location 174 includes guarded memory. Instance manager module 140 may be configured to generate an alert 180 in response to the determination that memory location 174 includes guarded memory. In some examples, alert 180 may indicate a threat to system 100.

Figure 2:
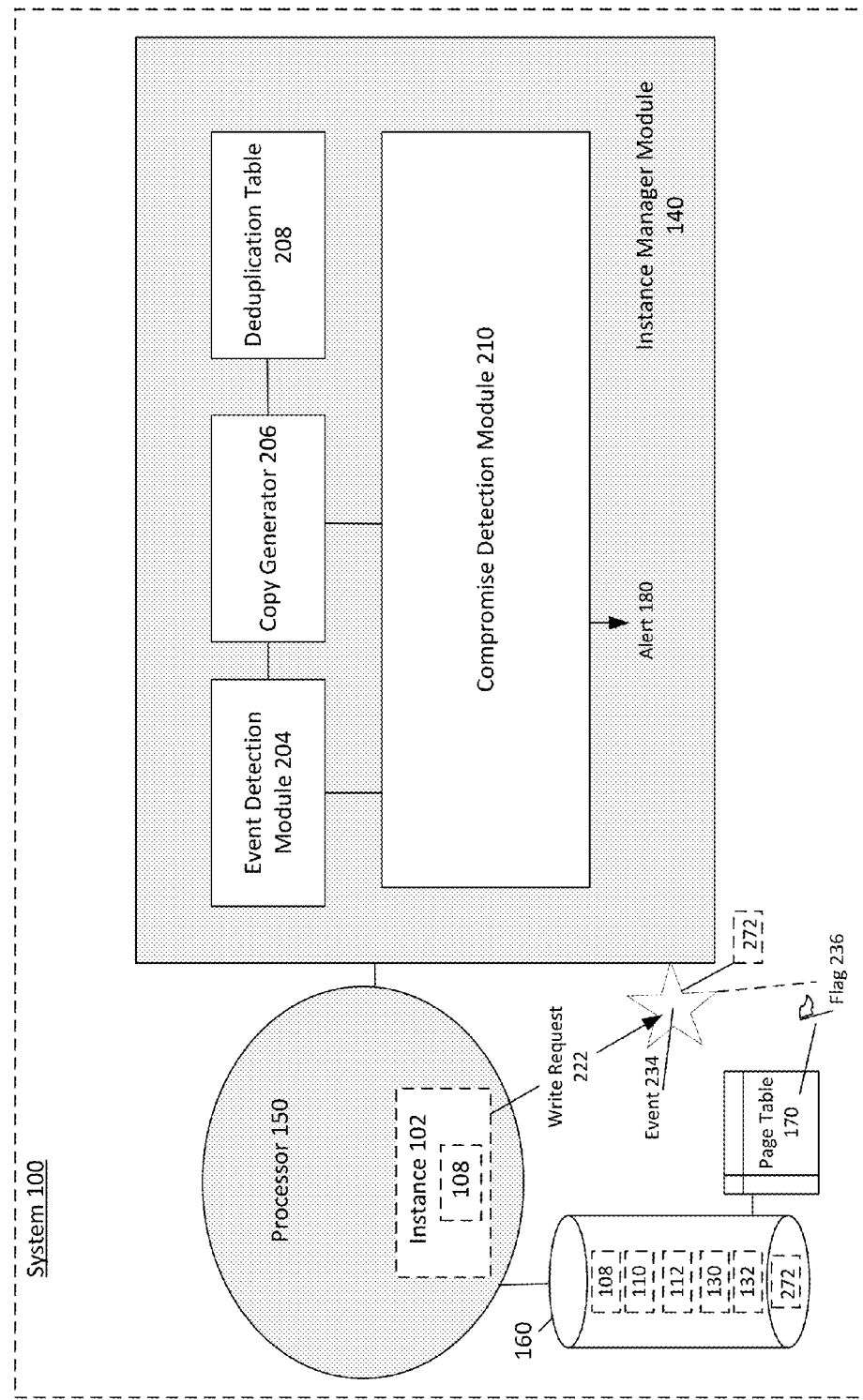
FIG. 2 depicts the example system of FIG. 1, with additional details relating to an instance manager module.

FIG. 2 depicts example system 100 of FIG. 1, with additional details relating to a compromise detection module, arranged according to at least some embodiments described herein. Those components in FIG. 2 that are labeled identically to components of FIG. 1 will not be described again for the purposes of clarity and brevity.

Instance manager module 140 may include an event detection module 204, a copy generator 206, a deduplication table 208, and a compromise detection module 210. Event detection module 204 may be, for example, hardware and/or a combination of hardware and instructions executable on the hardware configured to detect or register a memory write request which is directed to a flagged memory location. For example, processor 150 may experience an event 234 as a result of write request 222 being directed to a flagged memory location 272. In response to event 234, processor 150 may perform a context switch to instance manager module 140. Event detection module 204 may determine, based on information stored in registers of processor 150, that processor 150 is attempting to perform write request 222 which is directed to flagged memory location 272. In the example, flagged memory location 272 may be associated with a flag 236 in page table 170. Event detection module 204 may detect event 234 in response to write request 222 being directed to flagged memory location 272, based on information from processor 150. In some examples, flag 236 may be a copy on write flag. In examples where flag 236 is a copy on write flag, event 234 may be a copy on write event.

In response to the detection of event 234, copy generator 206 may be configured to generate a copy of data stored in the location of system memory 160 to which the write request is directed. Copy generator 206 may include hardware or some combination of hardware and instructions executable on the hardware. As will be discussed in further detail below, in some cases, copy generator 206 may generate the copy only after receiving a signal from compromise detection module 210. The copy may be sent to a portion of system memory 160 which may be designated and/or allocated to the virtual machine which generated the write request (such as memory 108 of instance 102, for example). Deduplication table 208 may be a data structure configured to store information regarding portions or locations of system memory 160 which have had data copied to virtual machine-allocated memory for modification. For example, deduplication table 208 may indicate that data stored in a particular page of shared memory 130 has been copied to memory 108 of instance 102 for modification. Some implementations may not include copy generator 206 and/or deduplication table 208.

Compromise detection module 210 may include hardware and/or some combination of hardware and instructions executable on the hardware. Compromise detection module 210 may be configured to receive an indication of events 134, 135, and/or 234 from event detection module 204. In response to receipt of the indication, compromise detection module 210 may determine whether or not a particular write request (such as, for example, write requests 122 and/or 124 from FIG. 1) is directed to a location in a guarded memory, such as guarded memory 132. If a write request is directed to a guarded memory location, compromise detection module 210 may be configured to generate alert 180. As will be discussed in further detail below, compromise detection module 210 may take one or more security actions in response to alert 180.

Figure 3:
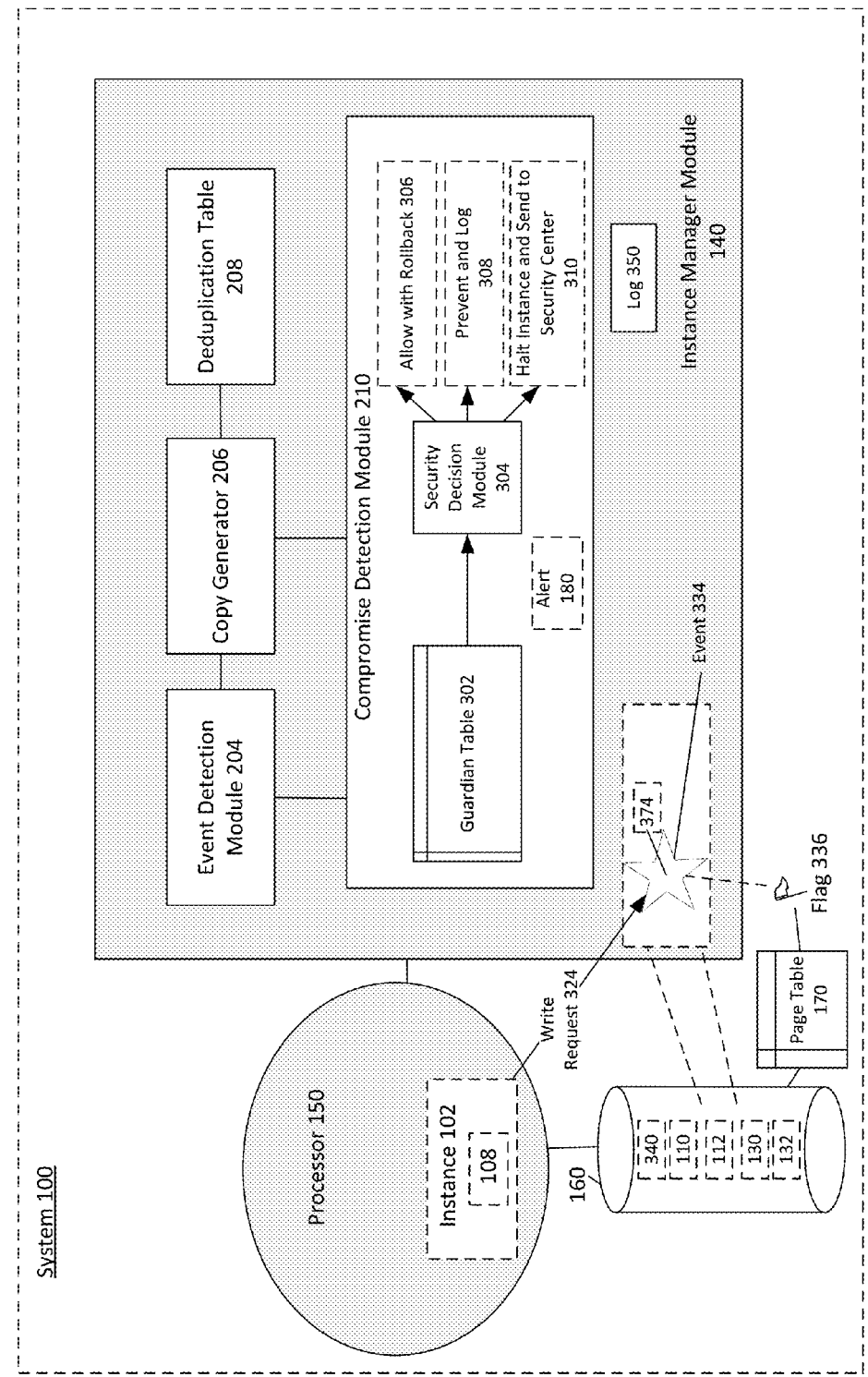
FIG. 3 depicts the example system of FIG. 1, with additional details relating to a compromise detection module.

FIG. 3 depicts example system 100 of FIG. 1, with additional details relating to a compromise detection module, arranged according to at least some embodiments described herein. Those components in FIG. 3 that are labeled identically to components of FIGS. 1 and 2 will not be described again for the purposes of clarity and brevity.

Compromise detection module 210 may include a guardian table 302 configured to be in communication with a security decision module 304. Guardian table 302 may be a data structure configured to store locations or addresses of guarded or write-protected system memory 160. Compromise detection module 210 may be configured to consult guardian table 302 in response to receipt of an indication that a copy on write event (such as, for example, events 134, 135, and/or 234) has been detected by event detection module 204. Compromise detection module 210 may consult guardian table 302 to determine whether or not a write request is directed to write data to a memory location which includes guarded memory. If a write request is directed to write data to a memory location which is denoted as guarded in guardian table 302, compromise detection module 210 may generate alert 180. In some examples guardian table 302 may include classifications or conditions relevant to one or more memory locations, such as rules for handling events based on series of events or based on the sources of the memory records. In some other examples, a virtual machine or other instance may be privileged to designate pages of memory as guarded memory in guardian table 302 through communication with instance manager module 140. In various examples, virtual machines may be unable to remove pages from guardian table 302, and thereby designate the pages as unguarded. In still other examples, instance manager module 140 may be privileged to remove pages from guardian table 302 in order to designate the pages as unguarded.

In some examples, operating systems may not have permission to access and/or modify data stored in guardian table 302—for example the instance manager module 140 may be configured to generate data in the guardian table or an operating system may be allowed to place records in the guardian table 302, but not to remove or alter the records. For example, the guardian table may take initiation of guarded status from existing operating system-level actions such as setting memory access restrictions, but may not allow the operating system alone to remove those protection settings in order to prevent compromise at the operating system level from removing guarded status. In some examples, a data center of system 100 may be configured to designate guarded memory locations in guardian table 302 at a security management interface of the data center. In various other examples, data stored in guardian table 302 may be modified by an application programming interface ("API") with one or more monitoring systems in place. In some examples a management system may deliver information about instance 102 and what memory should be guarded. In some examples, the API may include accepting HTTP (hypertext transfer protocol) get or post actions providing information in a pre-established format.

Security decision module 304 may detect and/or receive alert 180. Security decision module 304 may include hardware and/or some combination of hardware and instructions executable on the hardware. Security decision module 304 may be effective to take one or more actions in response to generation of alert 180. In some examples, security decision module 304 may be effective to determine an appropriate action based at least in part on the memory location to be written to, data currently stored at the memory location, and/or modifications to data implicated by the write request.

In one example, instance 102 may generate write request 324 to write to memory location 374 of system memory 160. Processor 150 may identify write request 324. In an example, write request 324 may be part of an attack on system 100. Processor 150 may identify flag 336 associated with memory location 374. Flag 336 may be a copy on write flag. Processor 150 may experience an event 334 as a result of write request 324 being directed to memory location 374 associated with flag 336. In response to event 334, processor 150 may perform a context switch to instance manager module 140. Event detection module 204 may detect event 334 based on write request 324 being directed to flagged memory location 374. In some examples, event detection module 204 may detect event 334 based on information about write request 324, which may be stored in one or more registers or memories of processor 150. Based on the detection of event 334, compromise detection module 210 may consult guardian table 302 to determine whether or not memory location 374 is guarded. In the example, guardian table 302 may indicate that memory location 374 includes guarded memory. Compromise detection module 210 may generate alert 180 in response to the determination that memory location 374 includes guarded memory.

Security decision module 304 may detect alert 180. In response to alert 180, security decision module 304 may determine an appropriate action based at least in part on memory location 374, data stored at memory location 374, and/or modifications to data stored at memory location 374 implicated by write request 324. In an example of a security action, security decision module 304 may perform security action 306, "Allow with Rollback." Security action 306 may include sending a signal to copy generator 206. The signal may be effective to instruct copy generator 206 to send a copy of the data stored at memory location 374 to memory location 340 or another location in system memory 160. In some examples, sending the copy of the data from memory location 374 to memory location 340 may be recorded in deduplication table 208 or in another table. Subsequently, security decision module 304 may allow write request 324 to write data to memory location 374. In some examples, security decision module 304 may log write request 324 in a log after allowing data to be written to memory location 374. At a later time, security decision module may decide to "rollback" the memory write. Rollback may include writing data saved in memory location 340 back to memory location 374, effectively "rolling back" the modifications to data stored at memory location 374. In some examples, security decision module 304 may decide to rollback based on a heightened security level, an increasing number of memory writes to guarded memory 132, and/or other suspicious activity.

In another example security action, security decision module 304 may perform security action 308, "Prevent and Log." Security action 308 may include preventing write request 324 from writing data to memory location 374. In some further examples, security decision module 304 may log write request 324 in a log 350. Log 350 may be a data structure which may include logs of suspicious and/or potentially malicious write activity. In some examples, log 350 may be stored in a memory, such as system memory 160. In some examples recording a log 350 may include sending event logs through a network to a log server.

In yet another example security action, security decision module 304 may perform security action 310, "Halt Instance and Send to Security Center." Security action 310 may include halting execution of instance 102 by processor 150 and sending instance 102 to a security center. A security center may be one or more computing devices effective to perform a detailed evaluation of the instance, run the instance under restricted security operating conditions, and/or clean the instance to remove malware.

In some examples, a data center of system 100 may be configured to scan and recognize some pages, blocks, and/or other portions of memory attributed to a particular virtual machine deployed at the data center. The data center may be able to determine an operating system and/or an application associated with the virtual machine, based on recognition of the particular virtual machine or characterization of its contents. The data center may select levels of security for any number of pages or portions of system memory 160 attributed to the virtual machine, based on the determined operating system and/or application. Based on the security level for the pages of system memory 160, compromise detection module 210 and/or security decision module 304 may set particular pages and addresses to allow data modification with logging to see if the security situation becomes more suspicious. The data center may be effective to raise and lower levels of security based on suspicious activity occurring at the particular pages and addresses. At a first threshold level of security, or after observing a threshold number or type of events qualified as suspicious, compromise detection module 210 and/or security decision module 304 may set larger areas of the memory to take security action 308, "Prevent and Log." At a second level of security, which may be higher than the first threshold level of security, security decision module 304 may perform security action 310 "Halt Instance and Send to Security Center."

In further examples, security settings for virtual machines and/or security settings which denote areas or portions of memory accessible by particular virtual machines, may be embedded in a certificate associated with virtual machines and/or applications. Compromise detection module 210, guardian table 302, and/or security decision module 304 may also associate different security levels with different locations in system memory 160 for each virtual machine or application under execution by processor 150.

In another example, one or more instances (such as instances 102, 104, and/or 106) may be applications or application components such as dynamic link libraries. In the example, instance manager module 140 may be a supervisory process separated from the instances by a virtualization wall. In some cases, such an implementation may take the form of microvirtualization or containerization. In this or other implementations, security decision module decisions to halt an instance may result in the immediate launch of a replacement instance to maintain overall system function.

Advantageously, a system in accordance with the present disclosure may allow potential security threats to be detected and dealt with prior to any memory write occurring and without constant memory scanning, which can deplete processing resources. A system may allow deduplication and flag based threat detection to be performed simultaneously. Furthermore, a system may benefit from a virtualization wall between an operating system and the hypervisor. A system may use the hypervisor to protect portions of memory, rather than using memory protection markers provided by the operating system. A virtual machine compromised by malware may lower defenses within the virtual machine operating system, but cannot gain root access to the hypervisor and alter the status of guarded memory because of the virtualization wall between the virtual machine under attack and the hypervisor. Furthermore, a system may be customizable such that different virtual machines and/or applications may be given different security levels. Additionally, the pages and/or addresses of memory associated with different virtual machines and/or applications may be given different security levels. Several different security actions may be tailored to particular virtual machines and/or applications based on various security levels. A system in accordance with the present disclosure may also reduce processing overhead, as the system may not require processor-intensive scanning of large portions of memory in order to detect potential threats.

Figure 4:
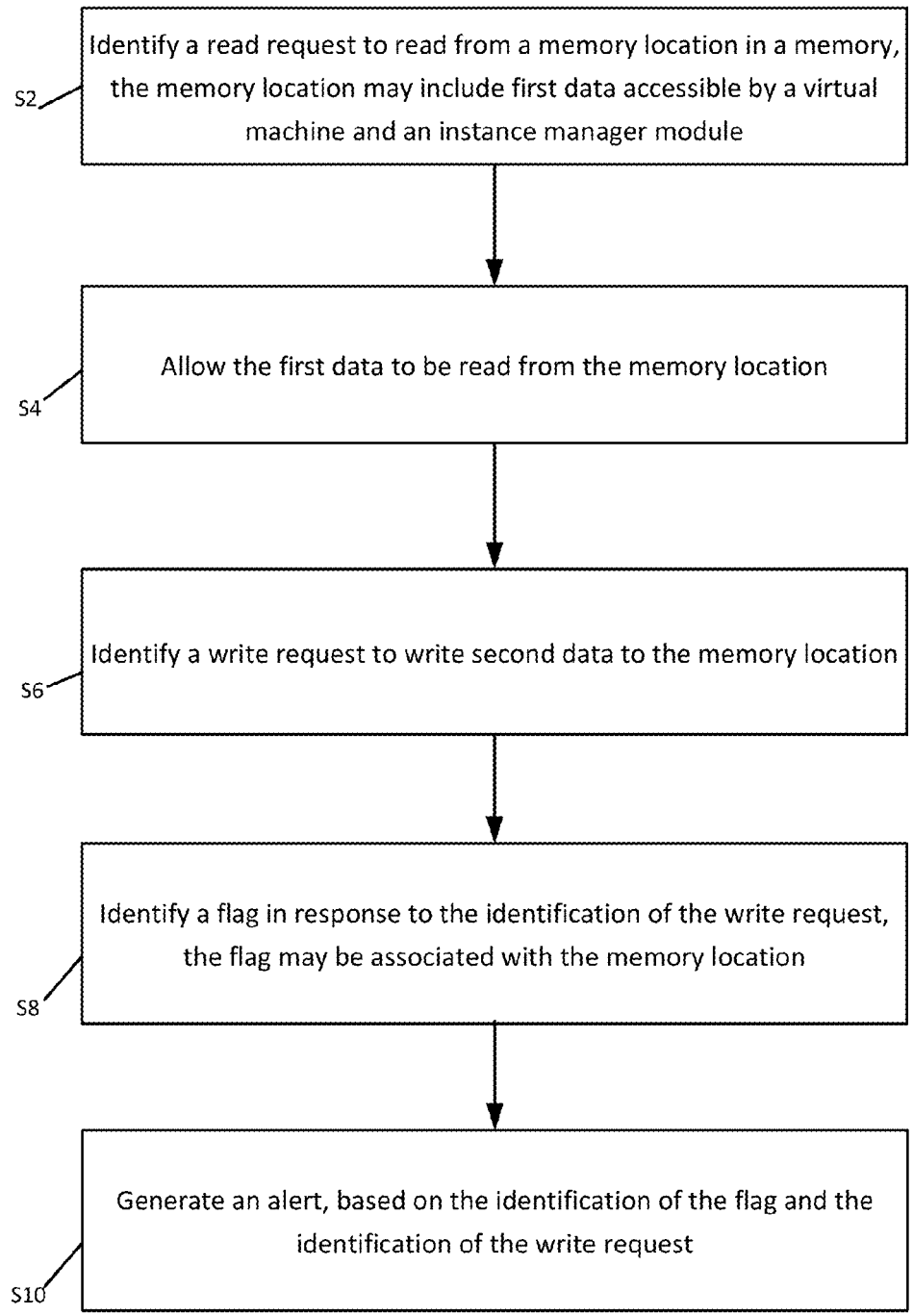
FIG. 4 depicts a flow diagram for an example process to implement a flag based threat detection.

FIG. 4 depicts a flow diagram for an example process to implement flag based threat detection, arranged in accordance with at least some embodiments described herein. In some examples, the process in FIG. 4 could be implemented using system 100 discussed above and could be used to detect threats based on flags in memory. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation. The process in FIG. 4 may be used by an instance manager module and/or hypervisor.

Processing may begin at block S2, "Identify a read request to read from a memory location in a memory, the memory location may include first data accessible by a virtual machine and an instance manager module." At block S2, a read request to read from a memory location in a memory may be identified. The memory location may include first data accessible by a virtual machine and a instance manager module.

Processing may continue from block S2 to block S4, "Allow the first data to be read from the memory location." At block S4, the first data may be allowed to be read from the memory location.

Processing may continue from block S4 to block S6, "Identify a write request to write second data to the memory location." At block S6, a write request to write second data to the memory location may be identified. Different write requests may be generated by different virtual machines. In some examples, memory locations may have a first portion and a second portion. A first level of security may be associated with a first portion and a second level of security may be associated with a second portion.

Processing may continue from block S6 to block S8, "Identify a flag in response to the identification of the write request, the flag may be associated with the memory location." At block S8, a flag may be identified in response to the identification of the write request. The flag may be associated with the memory location. In some examples, a determination may be made, in response to identification of the flag, that the memory location includes guarded memory. In some examples, flags may include copy on write flags. In some other examples, a determination may be made in response to a flag (such as a copy on write flag), that a memory location does not include guarded memory. In response to a determination that a memory location does not include guarded memory, and in response to identification of a flag, data at the memory location may be copied to a different memory location designed to the virtual machine which generated the write request. In some examples, a context switch from a virtual machine to a hypervisor may be performed when a write request is directed to a flagged memory location.

Processing may continue from block S8 to block S10, "Generate an alert, based on the identification of the flag and the identification of the write request." At block S10, an alert may be generated. The alert may be generated based on the identification of the flag and the identification of the write request. In some examples, generating the alert may be further based on a determination that the memory location includes guarded memory. In some other examples, data may be copied from a first memory location to a second memory location in response to generation of the alert. In further examples, data may be prevented from being written to a memory location in response to generation of the alert. In some examples, write requests may be logged in a log, in response to generation of an alert. In some other examples, execution of a virtual machine may be halted in response to generation of the alert. Halted virtual machines may be sent to a security center. In other examples, in response to an alert, first data may be allowed to be written to a first portion of a memory location with a first level of security and second data may be prevented from being written to a second portion of memory with a second level of security.

Figure 5:
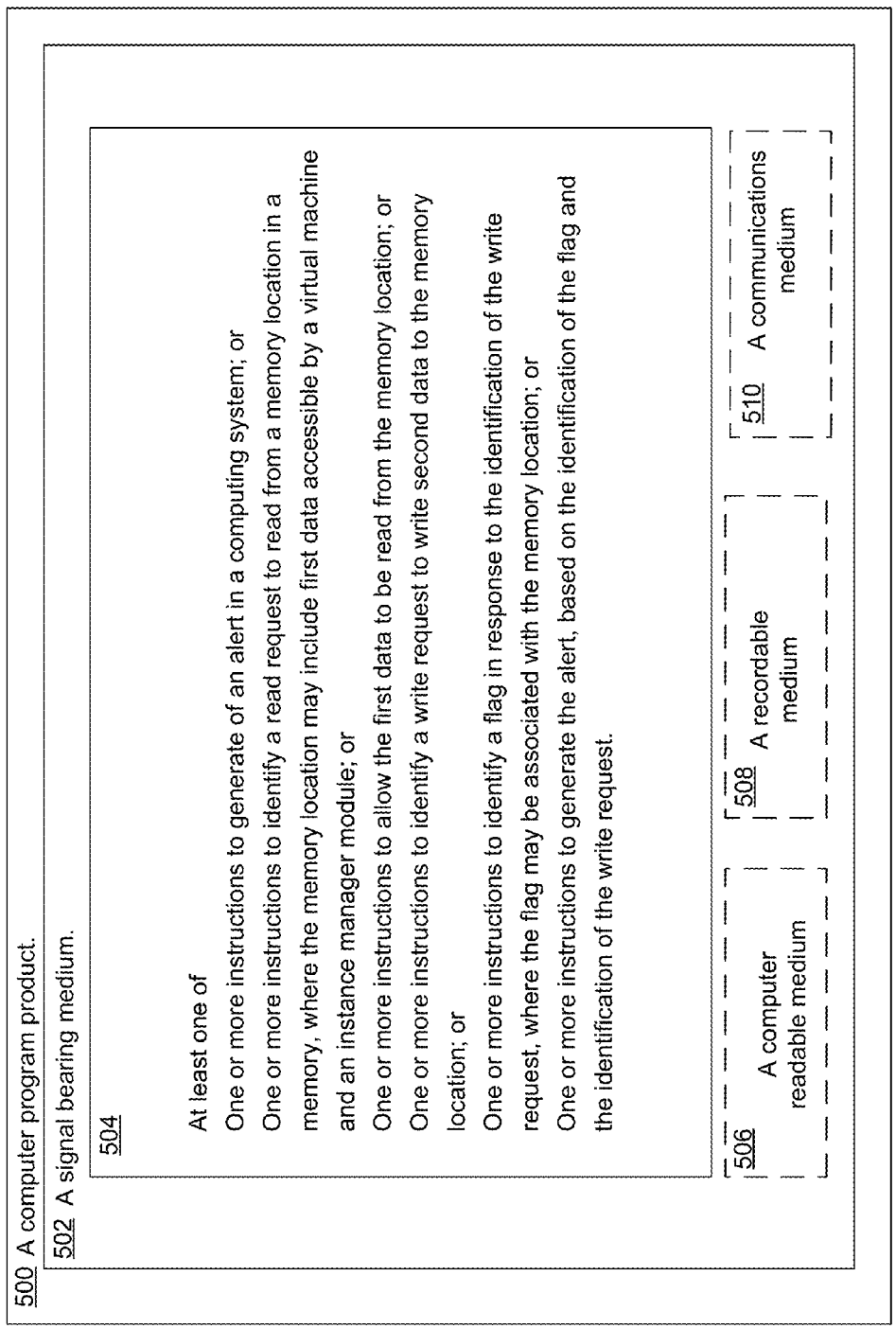
FIG. 5 illustrates an example computer program product that can be utilized to implement flag based threat detection.

FIG. 5 illustrates an example computer program product 500 that can be utilized to implement flag based threat detection arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, instance manager module 140 may undertake one or more of the blocks shown in FIG. 5 in response to instructions 504 conveyed to the system 100 by signal bearing medium 502.

In some implementations, signal bearing medium 502 may encompass a computer-readable medium 506, such as, but not limited to, a hard disk drive, a Compact Disc (CD), a Digital Video Disc (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

FIG. 6 is a block diagram illustrating an example computing device 600 that is arranged to implement flag based threat detection arranged in accordance with at least some embodiments described herein. In a very basic configuration 602, computing device 600 typically includes one or more processors 604 (such as processor 150) and a system memory 606 (such as system memory 160). A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622 and program data 624. Application 622 may include a flag based threat detection algorithm 626 that is arranged to perform the functions as described herein including those described with respect to system 100 of FIGS. 1-5. Program data 624 may include flag based threat detection data 628 that may be useful to implement flag based threat detection as is described herein. In some embodiments, application 622 may be arranged to operate with program data 624 on operating system 620 such that flag based threat detection may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disc (CD) drives or digital versatile disc (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate an alert in a computing system, the method comprising:
   receiving a guarded memory designation which indicates that a write-protected shared memory location includes guarded memory, wherein the write-protected shared memory location is in a memory, and wherein the guarded memory designation is received from a virtual machine;
   identifying a read request to read from the write-protected shared memory location, wherein the write-protected shared memory location includes first data accessible by the virtual machine and an instance manager module;
   allowing the first data to be read from the write-protected shared memory location;
   identifying a write request to write second data to the write-protected shared memory location;

identifying a flag in a table, in response to the identification of the write request, wherein the flag in the table is effective to indicate whether the write-protected shared memory location includes the guarded memory as indicated by the guarded memory designation, and wherein the table includes an association between the flag and the write-protected shared memory location;

determining, in response to the identification of the flag and based on the table that includes the flag, that the write-protected shared memory location includes guarded memory as indicated by the guarded memory designation;

prior to determining whether to write the second data to the memory in response to the determination that the write-protected shared memory location includes the guarded memory, generating the alert, based on the identification of the flag in the table and the identification of the write request; and in response to the generation of the alert, sending the alert to a compromise detection module, wherein the compromise detection module is configured to determine a security action that relates to the write-protected shared memory location, and wherein the security action includes:
 copying third data stored in a first portion of the write-protected shared memory location to a second portion of the write-protected shared memory location;
 writing the second data to the first portion of the write-protected shared memory location; and
 in response to an increase in a number of write operations to the first portion of the write-protected shared memory location, writing the third data back to the first portion of the write-protected shared memory location.

2. The method of claim 1, further comprising:
in response to the generation of the alert, logging the write request in a log.

3. The method of claim 1, wherein identifying the flag includes identifying a copy on write flag.

4. The method of claim 1, wherein the flag includes a first copy on write flag, wherein the write request includes a first write request generated by the virtual machine, wherein the write-protected shared memory location includes a first memory location, and wherein the method further comprises:
 identifying a second write request generated by the virtual machine, wherein the second write request is configured to write fourth data to a second memory location of the memory;
 identifying a second copy on write flag in the table in response to the identification of the second write request, wherein the second copy on write flag is associated with the second memory location;
 determining, in response to the identification of the second copy on write flag, that the second memory location does not include the guarded memory; and
 in response to the determination that the second memory location does not include the guarded memory and in response to the identification of the second copy on write flag in the table, copying fifth data stored at the second memory location to a third memory location designated to the virtual machine.

5. A method to generate an alert in a computing system, the method comprising:
 identifying a first write request to write first data to a first memory location of a memory, wherein the first memory location is accessible by a first virtual machine and a second virtual machine;
 identifying a first flag in a table, in response to the identification of the first write request, wherein the first flag is effective to indicate whether the first memory location includes guarded memory, and wherein the table includes an association between the first flag and the first memory location;
 creating a first event in response to the identification of the first flag in the table;
 in response to the first event, performing a first context switch to an instance manager module;
 in response to the first context switch and based on the table that includes the first flag, determining, by the instance manager module, that the first memory location does not include the guarded memory;
 in response to the determination that the first memory location does not include the guarded memory and in response to the identification of the first flag, copying second data stored at the first memory location to a second memory location;
 receiving a guarded memory designation which indicates that a third memory location includes the guarded memory, wherein the guarded memory designation is received from the first virtual machine or the second virtual machine;
 associating the third memory location with a second flag;
 identifying a second write request to write third data to the third memory location, wherein the third memory location is accessible by the first virtual machine and the second virtual machine;
 identifying the second flag in the table, in response to the identification of the second write request, wherein the second flag is effective to indicate whether the third memory location includes the guarded memory as indicated by the guarded memory designation, and wherein the table includes an association between the second flag and the third memory location;
 creating a second event in response to the identification of the second flag in the table;
 in response to the second event, performing a second context switch to the instance manager module;
 in response to the second context switch and based on the table that includes the second flag, determining, by the instance manager module, that the third memory location includes the guarded memory as indicated by the guarded memory designation;
 prior to determining whether to write the third data to the memory, generating the alert, in response to the determination that the third memory location includes the guarded memory as indicated by the guarded memory designation; and
 sending the alert to a compromise detection module, wherein the compromise detection module is configured to determine a security action that relates to the third memory location, wherein the security action includes:
  copying fourth data stored in the third memory location to a fourth memory location;
  writing the third data to the third memory location; and
  in response to an increase in a number of write operations to the third memory location, writing the fourth data back to the third memory location.

6. The method of claim 5, wherein identifying the first write request includes identifying a first write request generated by the first virtual machine, and wherein identifying the second write request includes identifying a second write request generated by the second virtual machine.

7. The method of claim 6, wherein the first and second virtual machines are configured to share access to the first memory location and the third memory location.

8. The method of claim 6, further comprising:
performing a context switch to a hypervisor in response to identification of the first or second flags.

9. The method of claim 5, further comprising:
in response to the generation of the alert, logging the second write request in a log.

10. A computing device, comprising:
a first memory that includes instructions; and
a processor configured to be in communication with the first memory, wherein the processor is effective to execute the instructions to:
identify a guarded memory designation which indicates that a shared memory location includes guarded memory, wherein the shared memory location is in a second memory, and wherein the guarded memory designation is obtained from a virtual machine;
identify a write request to write first data to the shared memory location, wherein the shared memory location includes second data accessible by the virtual machine and an instance manager module;
identify a flag in a table, in response to the identification of the write request, wherein the flag is effective to indicate whether the shared memory location includes the guarded memory as indicated by the guarded memory designation, and wherein the table includes an association between the flag and the shared memory location;
create an event in response to the identification of the flag in the table;
in response to the event, perform a context switch to the instance manager module;
in response to the context switch and based on the table that includes the flag, determine, by the instance manager module, that the shared memory location includes the guarded memory as indicated by the guarded memory designation;
in response to the event, identify a signal to generate a copy of the second data;
generate the copy of the second data;
send the generated copy of the second data to at least a portion of the shared memory location;
record the sent copy in a deduplication table;
prior to a determination of whether to write the first data to the memory, generate an alert, in response to the determination that the shared memory location includes the guarded memory as indicated by the guarded memory designation, wherein the alert indicates threat; and
send the alert to a compromise detection module, wherein the compromise detection module is configured to determine a security action that relates to the shared memory location.

11. The computing device of claim 10, wherein the shared memory location includes a first memory location, and wherein the processor is further effective to:
in response to the generation of the alert, write third data stored in the first memory location to a second memory location; and
subsequently allow the first data to be written to the first memory location.

12. The computing device of claim 10, wherein the processor is further effective to, in response to the generation of the alert, prevent the first data from being written to a first memory location included in the shared memory location.

13. The computing device of claim 10, wherein the processor is further effective to log the write request in a log, and wherein the log is stored in the second memory.

14. The computing device of claim 13, wherein the shared memory location includes a first portion and a second portion, and wherein the processor is further effective to:
associate a first level of security to the first portion;
in response to the alert, prevent the first data from being written to the first portion;
associate a second level of security to the second portion; and
in response to the alert, allow the first data to be written to the second portion.

15. The computing device of claim 10, wherein in response to the virtual machine being compromised by a malware, the security action corresponds to prevention of access by the compromised virtual machine to the guarded memory.

16. The computing device of claim 10, wherein different shared memory locations are associated with different virtual machines and different security levels, and wherein the different security levels correspond to different security actions.

* * * * *